Aug. 11, 1953     E. RAMSAY ET AL     2,648,535
APPARATUS FOR GASEOUS REDUCTION OF IRON ORE
Filed July 10, 1950                 4 Sheets-Sheet 1
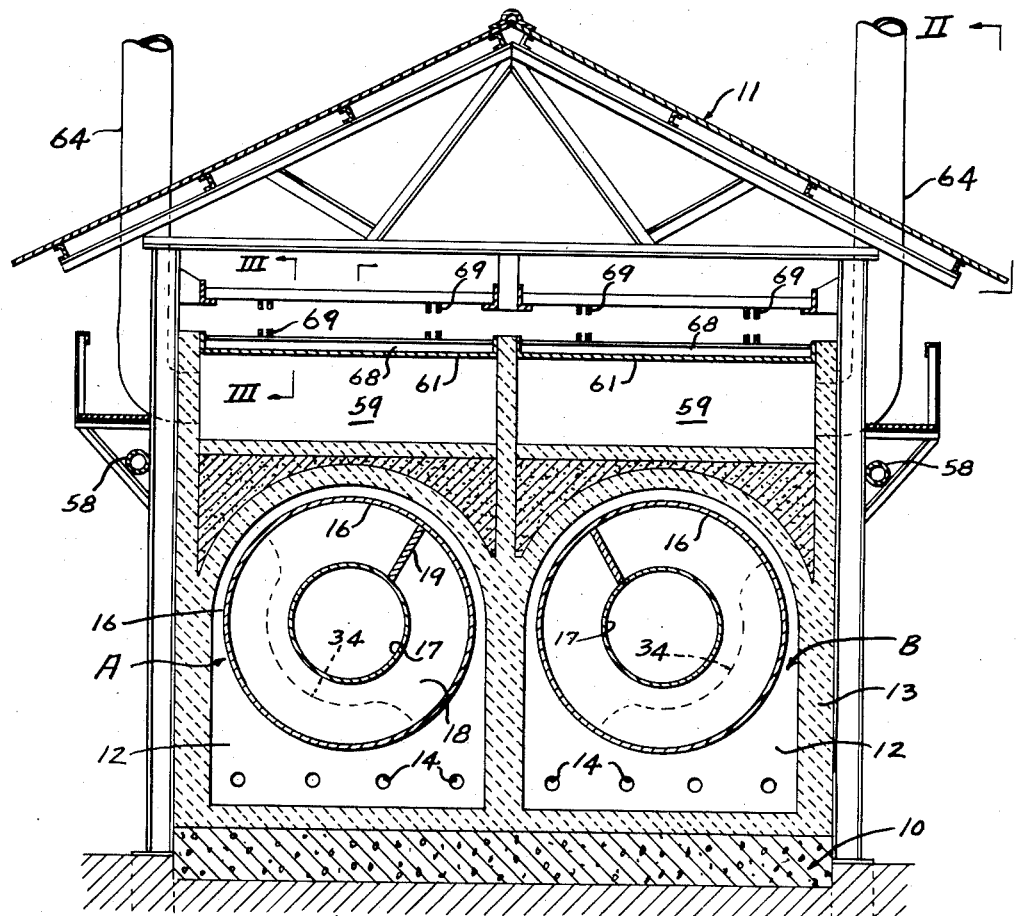
Fig. 1
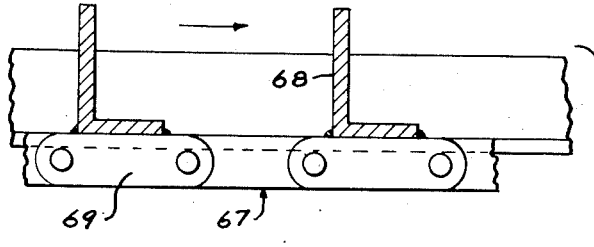
Fig. 3
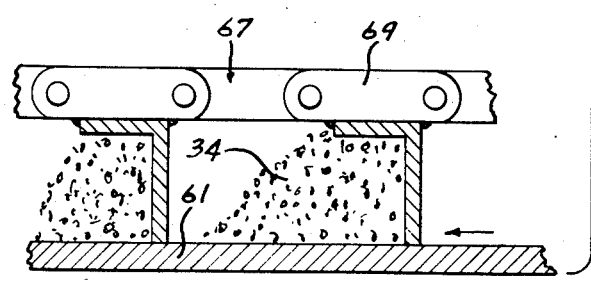
INVENTORS
ERSKINE RAMSAY
ROBERT T. BAGBY
BY Jennings & Carter
ATTORNEYS Aug. 11, 1953  E. RAMSAY ET AL  2,648,535
APPARATUS FOR GASEOUS REDUCTION OF IRON ORE
Filed July 10, 1950  4 Sheets-Sheet 4
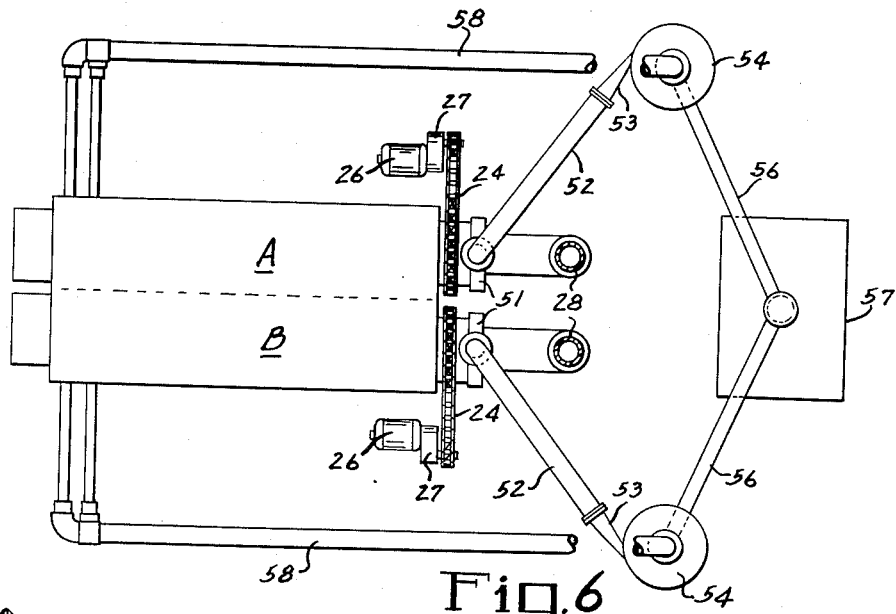
Fig. 6
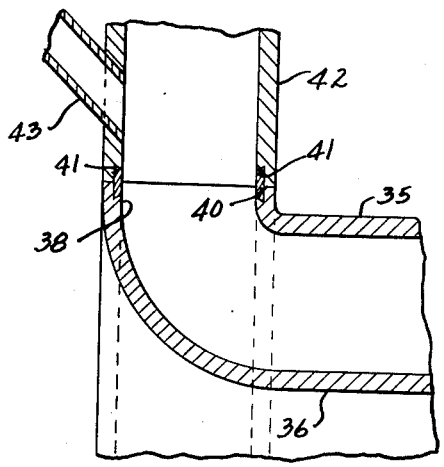
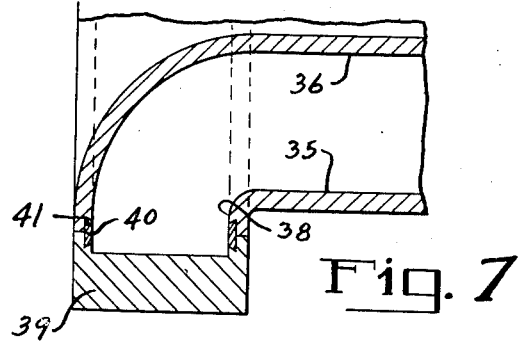
Fig. 7
INVENTORS
ERSKINE RAMSAY
BY ROBERT T. BAGBY
Jennings & Carter
ATTORNEYS Patented Aug. 11, 1953

2,648,535

UNITED STATES PATENT OFFICE 2,648,535

APPARATUS FOR GASEOUS REDUCTION OF IRON ORE

Erskine Ramsay and Robert T. Bagby, Birmingham, Ala.

Application July 10, 1950, Serial No. 172,876

8 Claims. (Cl. 266—24)

This invention relates to apparatus for the gaseous reduction of iron ore and has for an object the provision of such apparatus wherein the ore in a finely divided state is partially reduced by a gaseous reducing agent as the ore and reducing agent pass through a rotary converter.

Another object is to provide apparatus for gaseous reduction of iron ore in which a hydrocarbon gas and the ore are introduced into a rotating restricted spiral passage under heat and pressure and in such manner that the ore builds up in the bottom of the passage thus blocking the same, and is then blown out by the gas thereby producing a violent, turbulent mixture of the ore and gas and bringing the ore into intimate contact with the reducing gas, effecting partial reduction by a continuous process.

A still further object of our invention is to provide apparatus for the gaseous reduction of iron ore including a heated rotary converter having a restricted spiral path therein through which the ore passes being partially blown through by the replacing gas at a high temperature and pressure, and otherwise falling down the passage as it is raised in the rotation of the chamber.

A still further object is to provide apparatus of the character designated in which the hydrogen partially reduces the ore and the carbon of the gas is precipitated in the voids of the partially reduced ore and is conveyed with the ore to a reverberatory furnace where complete reduction takes place.

A still further object of our invention is to provide apparatus of the character designated in which the ore is pre-heated by the spent gases from the rotary converter.

Briefly our improved apparatus comprises means for introducing finely divided pre-heated ore and natural gas under pressure into an elongated rotary converter which has incorporated therein a restricted spiral passage. The converter rotates in a combustion chamber which is kept at a temperature sufficient to cause a dissociation of the hydrocarbon gas into hydrogen and carbon, but not high enough to cause the carbon to reduce the ore. As the ore and the decomposed hydrocarbon gases pass through the rotary converter the ore falls by gravity into the lower portion thereof thus momentarily blocking the passage in the spiral passage. The incoming gas under pressure then blows out the ore forming the block, thus providing violence in the conveyor and bringing the ore into intimate contact with the hydrogen gas which partially reduces the ore. This building up and blowing out of the ore from the lower portion of the rotating converter also increases the back pressure in the converter. The carbon is precipitated in the voids of the ore and is conveyed with the partially reduced ore to a reverberatory furnace where reduction is completed. Most of the hydrogen is used in the partial reduction of the ore in the rotary converter. The remaining hydrogen is separated from the ore and is returned to a second combustion chamber which pre-heats the ore as it is conveyed toward the entrance of the rotary converter.

Apparatus embodying features of our invention is illustrated in the accompanying drawings forming a part of this application in which:

Fig. 1 is a sectional view taken along line I—I of Fig. 2;

Fig. 2 is a sectional view taken along line II—II of Fig. 1;

Fig. 3 is a sectional view taken along line III—III of Fig. 1;

Fig. 6 is a diagrammatic plan view of the rotary converters communicating with a reverberatory furnace; and Fig. 7 is an enlarged sectional view of the means for introducing the ore and gas into the rotary converter.

Figure 4:
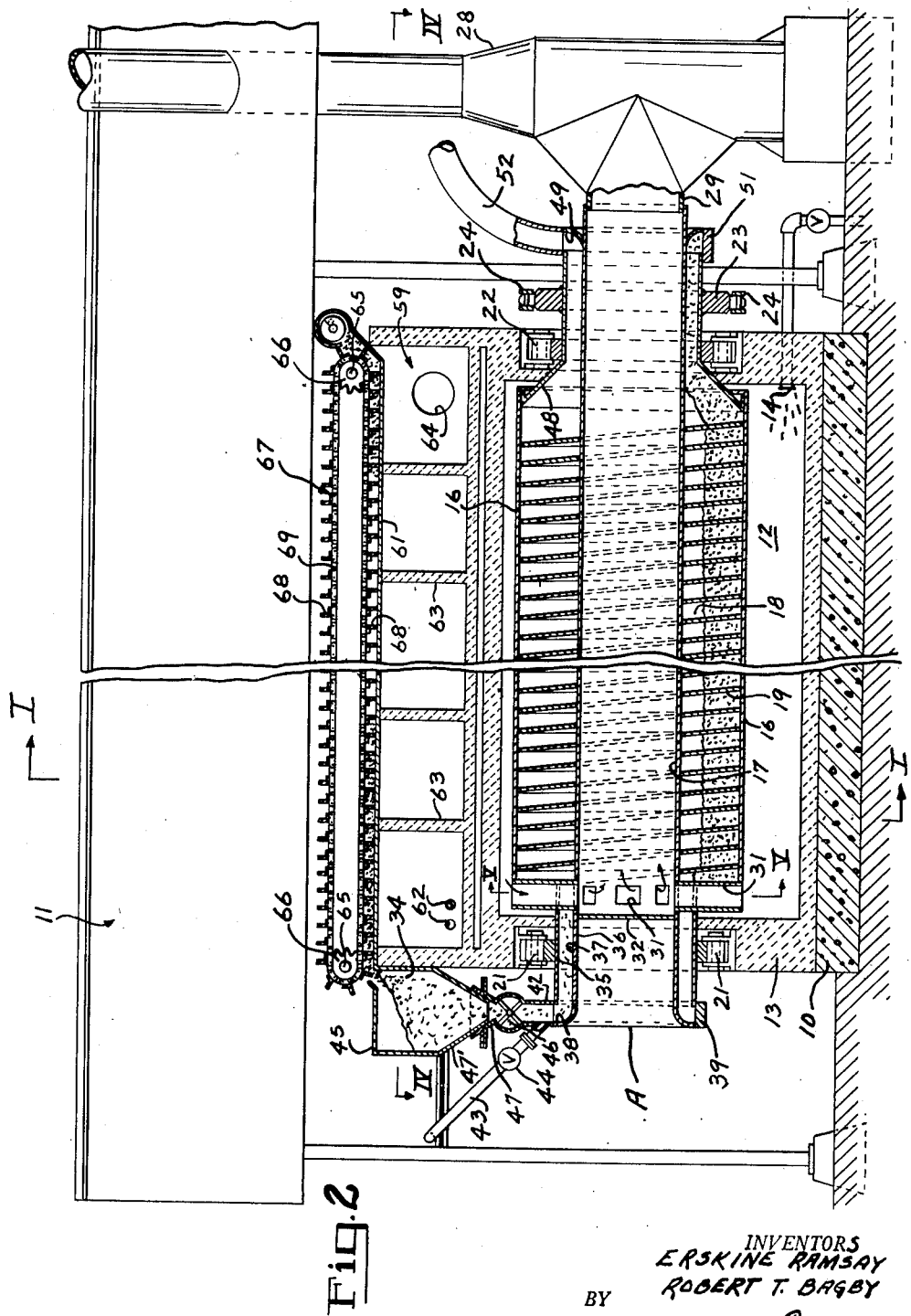
Fig. 4 is a plan view taken along line IV—IV of Fig. 2.

Referring now to the drawings for a better understanding of our invention, we show two rotary converters A and B mounted on a foundation 10. A suitable shelter 11 is provided over the converters. For convenience of description, throughout this specification and the claims, the forward portion of the apparatus will be that portion of the apparatus for receiving the ore to be reduced. Also, since the apparatus and operation of both converters is the same, the description and method of operation of only one converter will be given herein.

Figure 5:
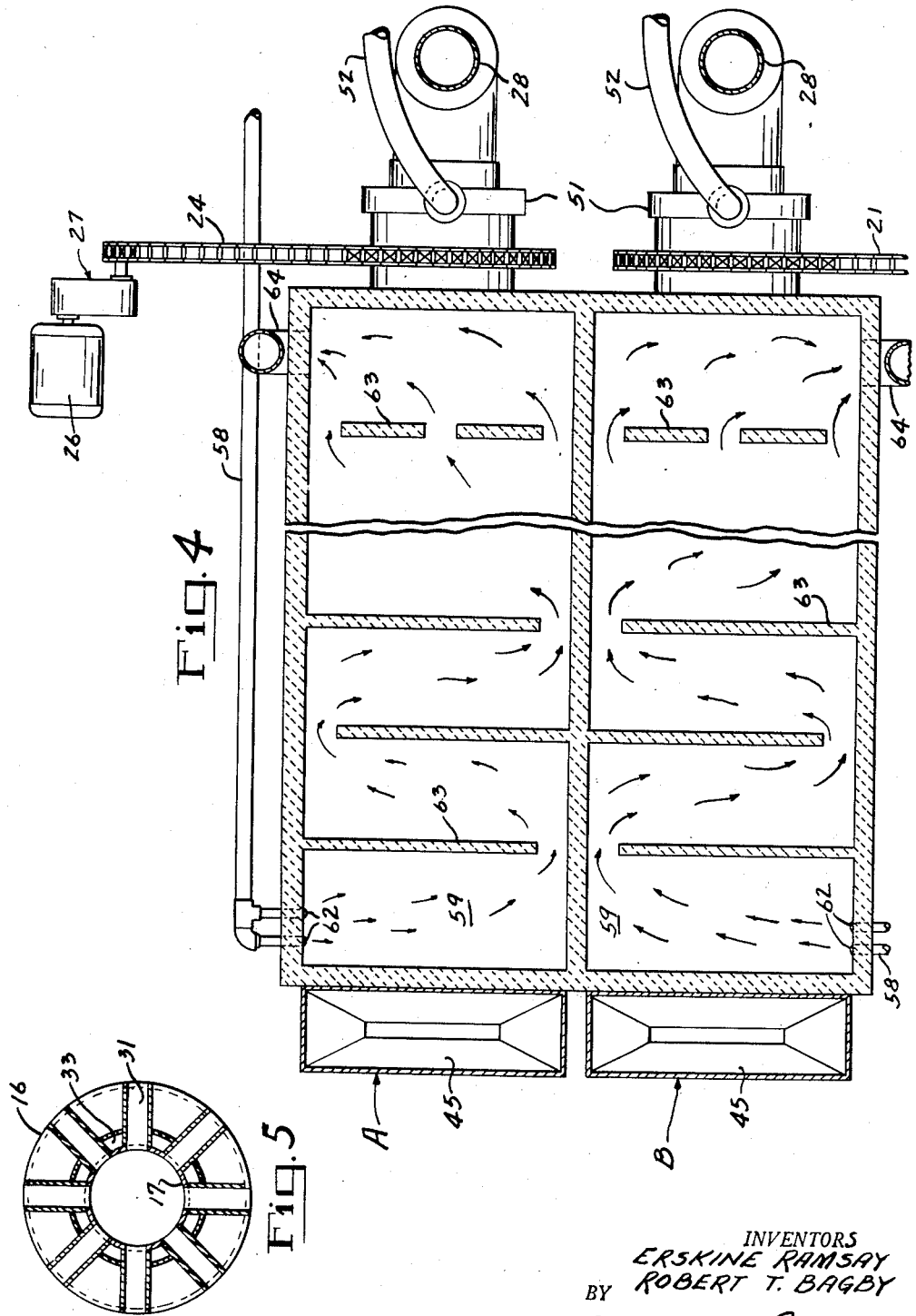
Fig. 5 is a view taken along line V—V of Fig. 2.

Each rotary converter is rotatably mounted in a combustion chamber 12 lined with fire brick 13 and having heating elements 14 in the lower portion thereof which may be gas burners or other suitable heating means. The converter comprises an elongated outer cylinder 16 having a central flue or cylindrical passage 17 extending therethrough and having a somewhat restricted elongated spiral passage 18 extending from end to end thereof and surrounding the flue 17. The spiral passage 18 is formed by a continuous spiral flight 19 which connects the outer cylinder 16 and the inner cylinder or flue 17. The converter is rotatably mounted in suitable bearings 21 at the forward end and bearings 22 at the rear end thereof and is rotated by any suitable means such as by a sprocket 23 and a drive chain 24 connected to a suitable source of power such as an electric motor 26. Reducing gears 27 are provided to reduce the speed so that the converter rotates at ⅓ revolution per minute. Adjacent the rear end of the converter is a smoke stack 28 communicating with the flue 17 by means of a sleeve 29 at the forward side of the smoke stack. The sleeve 29 extends forwardly and slidably fits within the rear end of the flue 17. The flue 17 is provided with a plurality of radial conduits 31 adjacent the forward end thereof through which the hot gases of combustion pass from the combustion chamber 12 to the flue 17. Immediately forward of the radial openings 31 is a plate 32 which extends across the flue 17 and seals the same forward of the radial conduits 31. The products of combustion pass from the combustion chamber 12 through the radial conduits 31 into the longitudinal extending flue 17 thence out through the smoke stack 28 to the atmosphere. The space defined between the cylinder 16 and the fire brick 13 of the combustion chamber provides a passage through which the products of combustion pass and heat the outer walls of the converter. As shown in Fig. 5 the forward end of the converter is provided with a plurality of longitudinally extending conduits 33 located between the radial openings 31 for passing ore 34 to be reduced and a hydrocarbon gas into the forward end of the spiral passage 18. Immediately forward of the spiral passage 18 is an outer cylinder 35 and an inner concentric cylinder 36 defining between them an annular space 37, which communicates with the conduits 33. The cylinder 36 may be a continuation of flue 17. The outer cylinder 35 also serves as a journal for the forward end of the converter in bearings 21. As shown in Fig. 7 the forward ends of the cylinders 35 and 36 are bent outwardly to form an annular opening 38 which opens outwardly with respect to the longitudinal axis of the converter. Slidably fitting over the opening 38 is a cylindrical sleeve member 39. The sleeve member 39 is held in place and a sealed joint is formed with the outer edges of the cylinders 35 and 36 by means of annular metal strips 40 dove-tailed in cross section which fits in cylindrical recesses 41 formed in the joining members. Communicating with the opening 38 is a pipe 42 which is secured to the top of the sleeve member 39. The hydrocarbon gas is introduced into the pipe 42 through a pipe 43 having a regulating valve 44 therein. Mounted above the pipe 42 is a hopper 45 having a rotary pressure sealed feeder 46 in the bottom thereof. The hopper 45 is divided adjacent the lower portion thereof to compensate for expansion and is provided with means whereby the bottom section 47 of the hopper will move relative to the top section 47' without forming a gap between the two sections.

At the rear end of the converter the outer cylinder 16 slopes inwardly as at 48 and then rearwardly parallel to and spaced from the flue 17 to form a journal for the rear end of the converter in bearings 22. The rear ends of cylinder 16 and flue 17 are bent outwardly in the same manner as the forward ends of cylinders 35 and 36 to form an annular opening 49 which also opens outwardly with respect to the longitudinal axis of the converter. A cylindrical sleeve member 51 slidably fits over the opening 49. One end of a pipe 52 for conveying the partially reduced ore and spent gases from the converter communicates with the opening 49 and is secured to the sleeve 51 at the top thereof. The other end of the pipe 52 is tapered as at 53 to approximately one half the diameter of pipe 52 to create a back pressure in the converter and is connected to the inlet side of a cyclone separator 54 where the gas is separated from the ore. A pipe 56, connected to the bottom of the separator 54 conveys the partially reduced ore to a reverberatory furnace 57 where complete reduction of the ore takes place in a manner well understood.

A pipe 58 connected to the outlet side of the separator 54 conveys the spent gases to a second combustion chamber 59 located above the combustion chamber 12. Mounted on and extending across the combustion chamber 59 is a metal plate 61, said plate extends upwardly at the rear end thereof to receive the ore to be preheated from a crushing plant not shown. The forward end of the plate 61 joins the upper adjacent edge of the hopper 45. The gas is burned in the forward portion of the chamber 59 by suitable burners 62 and the products of combustion are deflected through the chamber 59 by means of baffles 63 and thence out through a stack 64 to the atmosphere. Rotatably mounted, on shafts 65, above the forward and rear ends of the chamber 59 are sprockets 66 for driving an ore conveyor 67 comprising a plurality of angles 68 secured to endless chains 69. As the chains rotate clockwise the lower edges of the angles 68 contact the plate 61 as they pass thereover and move the ore 34 toward the hopper 45. The plate 61 transfers the heat from the chamber 59 to the ore as it passes thereover.

From the foregoing the operation of our improved apparatus for reducing iron ore will be readily understood. The ore in a finely divided state is fed onto the rear portion of plate 61 and is conveyed across said plate 61 by the conveyor 67 thereby pre-heating the ore to approximately 600° F. The pre-heated ore falls into the hopper 45 and is fed through the rotary feeder 46 into pipe 42. A hydrocarbon gas such as natural gas is also introduced into the pipe 42 at a pressure of from 300 to 400 pounds per square inch. The pressure sealed rotary feeder 46 prevents the ore from being blown upwardly into the hopper by the pressure in pipe 42. The preheated ore and hydrocarbon gas passes through the conduits 33 and is forced by the gas pressure into the spiral passage 18, the converter rotating in a direction to cause the ore to move toward the rear end thereof. As the converter rotates the ore falls by gravity into the lower portion of the restricted spiral passage and thus blocking it momentarily. The incoming gases under pressure then blow out the ore block thereby bringing the ore into intimate contact with the reducing gas. As the ore and hydrocarbon gas passes through the spiral passage 18 it is heated to a temperature of from 1400 to 1800° F. by burning natural gas in the combustion chamber 12 as described above. The hydrocarbon gas at this temperature decomposes into hydrogen and carbon. The carbon is precipitated in the voids of the ore while the hydrogen partially reduces the ore as it passes through the spiral passage 18. The ore containing the carbon and the unused hydrogen gas passes through pipe 52 thence through the tapered portion 53 to the separator 54. In the separator 54 the gases are separated from the ore and carbon and returned to the combustion chamber 59 for preheating the ore. The ore and carbon pass from the separator 54 into the reverberatory furnace 57 where complete reduction of the ore takes place.

In the operation of our apparatus for reducing iron ore, we have found that approximately 10,000 cubic feet of natural gas, at standard temperature and pressure, per ton of ore is required in the rotary converter to be decomposed into hydrogen and carbon. This amount of gas reduces approximately one-third of the oxygen with the hydrogen and provides approximately 310 pounds of carbon in the voids of the ore for completing the reduction of the ore in the reverberatory furnace. Approximately 10,000 cubic feet of gas, at standard temperature and pressure, per ton of ore is required to heat the rotary converter; and approximately 10,000 cubic feet of gas, at standard conditions, per ton of ore is required to complete the reduction of the ore in the reverberatory furnace, thus making a total of 30,000 cubic feet of natural gas for complete reduction of one ton of ore. We have also found that approximately 90% of the heat value of the hydrogen gas is used in the rotary converter to partially reduce the ore. The spent gases are used to preheat the ore as described above thus utilizing practically all of the fuel value of the hydrogen gas.

From the foregoing it will be apparent that we have devised improved apparatus for reducing iron ore with a hydrocarbon gas. By providing apparatus whereby the ore is reduced continuously and practically all of the heat value of the reducing gases is utilized, the iron ore is reduced more economically.

While we have shown our invention in but one form, it will be obvious to those skilled in the art that it is not so limited, but is susceptible of various changes and modifications without departing from the spirit thereof, and we desire therefore, that only such limitations shall be placed thereupon as are specifically set forth in the appended claims.

What we claim is:

1. Apparatus for partial gaseous reduction of iron ore comprising a heating chamber, a reducing chamber having a restricted annular spiral opening therethrough defined by inner and outer cylindrical walls and rotatably mounted in the heating chamber, a centrally disposed opening along the longitudinal axis of the reducing chamber defined by said inner cylindrical wall, means to introduce continuously the ore to be reduced and a hydrocarbon gas into the forward end of said spiral opening under pressure, means communicating said heating chamber with one end of said centrally disposed opening, there being an outlet at the other end of said centrally disposed opening and means in said heating chamber to heat indirectly said ore and gas as the same passes through the spiral opening to a temperature to cause a dissociation of the gas into hydrogen and carbon and cause the hydrogen to partially reduce the ore.

2. Apparatus for partial gaseous reduction of iron ore comprising a combustion chamber, a rotary converter having inner and outer cylindrical walls and rotatably mounted in said combustion chamber, there being a centrally disposed flue through said converter defined by said inner cylindrical wall, a plate sealing the forward end of said flue and a smoke stack at the rear end thereof, there being openings at the forward end of said flue communicating said flue with the combustion chamber, there being a spiral passageway through said converter between said inner and outer cylindrical walls, means to introduce the ore to be reduced and a hydrocarbon gas into the forward end of said spiral passageway under pressure, and burners in the combustion chamber heating the ore and hydrocarbon gas to a temperature to decompose the gas into hydrogen and carbon and partially reduce the ore with a portion of the hydrogen gas.

3. Apparatus as defined in claim 2 in which there is a second combustion chamber above the first named combustion chamber for preheating the ore to be reduced by burning the unused hydrogen gas.

4. Apparatus as defined in claim 3 in which there is a metal plate above the second combustion chamber and a conveyor above the plate for moving the ore across the top of said plate thereby causing the heat from the second combustion chamber to be transferred to the ore.

5. Apparatus for gaseous partial reduction of iron ore comprising a combustion chamber, a rotary converter having inner and outer cylindrical walls, and rotatably mounted in suitable bearings in said combustion chamber, there being a spiral opening defined between said cylindrical walls for passing the ore to be reduced and a hydrocarbon gas, there being a centrally disposed opening along the longitudinal axis of the rotary converter defined by said inner cylindrical wall, a plate extending across and sealing said centrally disposed opening at the forward end thereof, there being a plurality of radial conduits rearward of said plate communicating the centrally disposed opening with the combustion chamber, a stack for the products of combustion communicating with the rear end of said centrally disposed opening, inner and outer cylinders secured to the forward end of said converter defining an annular space therebetween, there being a plurality of openings at the forward side of the spiral opening communicating with said annular space for introducing ore and the hydrocarbon gas into said spiral opening, burners in the combustion chamber heating said hydrocarbon gas to a temperature to decompose the same into hydrogen and carbon and partially reduce the ore with the hydrogen means to introduce the ore and gas into said annular space, and a pipe conveying the partially reduced ore containing the carbon and spent gases from the rear end of the spiral opening to a separator for separating the spent gases from the ore and carbon.

6. Apparatus as defined in claim 5 in which the pipe conveying the partially reduced ore containing the carbon and the spent gases to the separator is tapered to approximately one-half its size at a point adjacent said separator for building up back pressure in the converter.

7. Apparatus as defined in claim 5 in which the means to introduce the hydrocarbon gas and ore into the annular space at the forward end of the rotary converter comprises a cylindrical sleeve slidably fitting over the outer ends of the cylinders defining said annular space, there being an opening in the sleeve for receiving the gas and ore.

8. Apparatus as defined in claim 7 in which the ore and hydrocarbon gas are introduced through a pipe which communicates with the opening in said sleeve, the ore being introduced into said pipe through a rotary pressure sealed feeder.

ERSKINE RAMSAY.
ROBERT T. BAGBY.

References Cited in the file of this patent

UNITED STATES PATENTS

| Number | Name | Date |
|---|---|---|
| 109,355 | Smith | Nov. 15, 1870 |
| 236,648 | Thompson | Jan. 11, 1881 |
| 1,544,111 | Stansfield | June 30, 1925 |
| 1,759,173 | Smith | May 20, 1930 |
| 1,891,850 | Trent | Dec. 20, 1932 |
| 1,938,832 | Hougen et al. | Dec. 12, 1933 |
| 2,036,578 | Keyes | Apr. 7, 1936 |
| 2,113,058 | Mullen | Apr. 3, 1938 |
| 2,158,689 | Buchanan | May 16, 1939 |
| 2,235,154 | Jones | Mar. 18, 1941 |
| 2,384,971 | Silvasy et al. | Sept. 18, 1945 |
| 2,500,553 | Lykken | Mar. 14, 1950 |